Jan. 10, 1956  D. O. CARLSON  2,730,493
PROCESS FOR RECOVERY OF COPPER FROM CUPRIFEROUS ORE
Filed Sept. 29, 1951
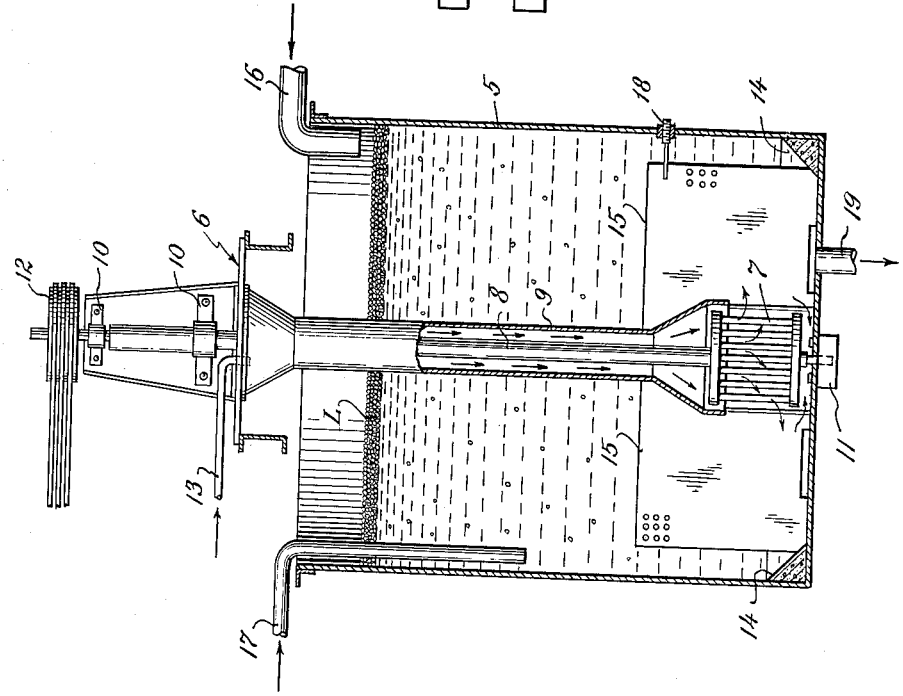
INVENTOR
Donald O. Carlson
BY
ATTORNEYS

United States Patent Office 2,730,493
Patented Jan. 10, 1956

2,730,493

PROCESS FOR RECOVERY OF COPPER FROM CUPRIFEROUS ORE

Donald O. Carlson, Inspiration, Ariz., assignor to Inspiration Consolidated Copper Company, a corporation of Maine Application September 29, 1951, Serial No. 248,943

8 Claims. (Cl. 204—108)

This invention relates to the dissolving of copper, and is especially directed to the provision of an improved procedure for dissolving finely divided metallic copper, such as cement copper, by agitating and aerating an acid solution in the presence of a frothing agent in which the copper to be dissolved is dispersed.

The new dissolving technique may be embodied with advantage in a process for the recovery of copper from a cupriferous ore which involves leaching the ore with an acid leach solution to dissolve its copper content and then electrolyzing the solution to recover the copper as a metallic cathode deposit. In such a process, in the final stage of the leaching operation, the leached ore is washed with water to remove as much as possible of the copper-bearing leach solution adhering to it. The resulting dilute copper-bearing wash water is passed over scrap iron, which causes the dissolved copper to precipitate in the finely divided metallic form known as "cement copper." The usual procedure is then to treat the cement copper in a copper smelter, where it is incorporated in a blister copper product which is sent to an electrolytic copper refinery. The present invention provides a procedure whereby the metallic cement copper may be efficiently dissolved in an acid solution, advantageously regenerated leach solution, and thereby makes possible an improved alternative procedure for the treatment of cement copper produced in the manner described above.

Briefly stated, the method of the invention for dissolving finely divided metallic copper, such as cement copper, comprises agitating and aerating an acid solution, in which the copper to be dissolved is dispersed, and incorporating a frothing agent in said solution during the course of such agitation and aeration. By this procedure the metallic cement copper is dissolved substantially completely and in a reasonably short period of time. In applying this dissolving procedure to a process in which (a) the ore is leached with an acidic solution to obtain a strong copper-bearing leach solution, (b) the leached ore is washed with water to recover a dilute copper-bearing wash solution, (c) the strong leach solution is electrolyzed to recover metallic copper, and (d) the dilute wash solution is treated with metallic iron to produce metallic cement copper, the cement copper is dissolved by the new technique, advantageously in the regenerated acid leach solution withdrawn from the electrolytic operation (which solution has become depleted in copper as a result of such electrolysis), and the solution in which the cement copper has been dissolved is united with the strong leach solution and is electrolyzed with it.

A preferred procedure for dissolving copper in accordance with the invention, and an advantageous embodiment of the new dissolving technique in a process for the recovery of copper, are described below with reference to the accompanying drawings, in which Fig. 1 is a vertical section through a form of agitating and aerating apparatus which has been used with success in dissolving copper in accordance with the invention; and Fig. 2 is a schematic flow sheet of a copper recovery process in which the new dissolving procedure is embodied.

Metallic copper is not soluble to any significant extent in dilute acid solutions under non-oxidizing conditions. Especially, it is substantially insoluble in non-oxidizing solutions of sulfuric acid. If the solution is sufficiently oxidizing in character to convert the metallic copper to an oxidized copper compound, it dissolves quite readily; but it has not been economically practical heretofore to dissolve copper in oxidizing solutions of sulfuric acid because the oxidizing agents recognized as most effective for promoting rapid dissolution of the copper are quite costly or are disadvantageous for some other reason. For example, it has long been known that dissolved oxygen from the air exerts a sufficiently strong oxidizing influence on metallic copper to enable it to dissolve if the solution also contains an acid such as sulfuric acid. The oxygen must, however, be dissolved in the solution for it to be effective, and the difficulty of dissolving atmospheric oxygen in acid solutions is great enough so that the dissolving of copper in a conventionally aerated acid solution proceeds too slowly for the reaction to be of commercial significance.

The present invention is based on the discovery that if a frothing agent is incorporated in an acid solution to which cement copper or other finely divided metallic copper is added, and if the solution with the copper therein is vigorously agitated and aerated, oxygen from the air dissolves quite readily and quite rapidly in the solution and promotes dissolving of the copper at a rate fast enough to be commercially useful.

By the term "frothing agent," as used herein and in the appended claims, I mean all of those substances known as such, or as "frothers," in the art of froth flotation. They are, in general, substances which reduce the surface tension of an aqueous solution and are used in the flotation art to enable the formation of a stable froth when air is blown through an aqueous pulp. Pine oil is a very well-known frothing agent that has been used with particular success in carrying out the dissolving method of the present invention. Other well-known frothing agents that can be used successfully include cresylic acid, aliphatic alcohols having from seven to ten carbon atoms, sulfates and sulfonates of long-chain aliphatic alcohols, and terpineol; but these compounds are mentioned merely by way of example, it being understood that any frothing agent capable of substantially reducing the surface tension of an acid solution of copper sulfate can be used successfully in carying out the method of the invention.

When metallic cement copper is to be dissolved in a solution of sulfuric acid, it is desirable that the acid concentration of the solution be in the range from 75 to 225 grams per liter. If the acid concentration is too low, the copper does not dissolve very rapidly, and if the acid concentration is too high, the solubility of oxygen in the solution is reduced to such an extent that again the speed of the dissolving operation is significantly reduced. In general, most satisfactory results are obtained when the solution contains approximately 150 grams per liter of sulfuric acid.

It is necessary of course that the suspension of cement copper or other finely divided copper in the acid solution be vigorously agitated and aerated throughout the course of the dissolving operation. Agitation is necessary to insure that the metallic copper is kept in suspension so that it is at all times readily accessible to oxidation by the dissolved oxygen. Vigorous aeration is necessary in insure that the solution is maintained substantially saturated with dissolved oxygen at all times and throughout its bulk. It is not enough merely to add "some air"—there must be sufficient air to maintain the solution substantially saturated. Of course, only a portion of the oxygen in the air passed through the solution will be dissolved therein, but the degree of aeration should be sufficiently vigorous so that throughout the solution there will continuously be a supply of air bubbles containing sufficient oxygen to replace promptly the dissolved oxygen which is consumed in oxidizing the metallic copper to an acid-soluble form. This requires that the degree of aeration be adequate so that a continual escape of air bubbles occurs at the surface of the solution throughout the course of the dissolving operation.

While an increase in temperature might be expected to increase the rate at which the dissolving reactions proceed, it also reduces the amount of oxygen that can be dissolved in the solution, and in this way retards the rate of dissolving. The dissolving reaction, however, is exothermic and may inherently lead to a substantial increase in the temperature of the solution. In batch operations the temperature of the solution may for this reason attain a maximum value in the range from 70 to 80° C.

The dissolving of cement copper in accordance with the method of the invention has been carried out with particular success in apparatus of the character shown in Fig. 1. This apparatus comprises a cylindrical tank 5 of acid resistant construction (e. g. a lead-lined steel). Centrally disposed within the tank is an agitator and aerator mechanism 6 comprising an impeller rotor 7 mounted near the bottom of the tank on the lower end of a rotor shaft 8, and a casing 9 surrounding the rotor shaft 8 and extending from above the upper edge of the tank to the upper edge of the impeller rotor 7. The rotor shaft is journaled in bearings 10 and 11 at the top and bottom of the tank, and is provided at its upper end with a pulley 12 by which it can be rotated at a rapid rate. An air supply pipe 13 leading to the annular space between the casing 9 and the rotor shaft 8 is provided for introducing air along the path indicated by the arrows into the solution within the tank.

The main bulk of the solution in which the copper is to be dissolved is delivered into the tank 5 through a pipe 16. An additional pipe 17 is provided for introducing acid into the solution in the amount required to bring its acid concentration up to whatever value is desired (preferably in the range from 75 to 250 grams per liter). Cement copper to be dissolved may be simply dumped or shovelled into the tank, and frothing agent may be added to the solution therein in any convenient manner.

It will be noted that the aeration and agitation mechanism 6 is essentially the same as is employed in a Fagergren flotation cell. When the impeller 7 is rapidly rotated, it serves to agitate solution within the tank 5; and co-incidentally air delivered through the casing 9 is broken up into small bubbles by the impeller and is thus finely disseminated throughout the body of the solution. The tank 5 is cylindrical to avoid having "dead" corners where solution may lie relatively quiescent, and a fillet 14 is advantageously provided at the juncture of the tank bottom with its cylindrical wall to prevent the occurrence of a similar dead space in this region of the tank. A plurality of perforated baffles 15, arranged in vertical planes, extend radially from the periphery of the impeller 7 to the walls of the tank to prevent the impeller from imparting excessive rotary motion to the solution in the tank.

In carrying out the new dissolving method in the apparatus described above, the tank 5 is filled substantially to the level L with an aqueous sulfuric acid solution, and cement copper to be dissolved is then introduced into the solution in the tank. The impeller 7 is rotated rapidly enough to keep the cement copper in suspension and to insure adequate and continuous aeration of the solution. Acid as required to build up the acid concentration of the solution to the most advantageous value (say, to 150 grams per liter) is introduced through the acid delivery pipe 17. Pine oil or other frothing agent is also added to the solution. Preferably the total amount of frothing agent used is not added all at once at the beginning of the operation, but instead portions of such total amount are added at intervals throughout the course of the dissolving operation, so that an adequate supply, but not an excess, of frothing agent is present in the solution at all times.

The amount of cement copper initially introduced into the solution is preferably in the neighborhood of 8% by weight of the solution that is introduced through the solution delivery pipe 16. This proportion of cement copper to solution has been found to be optimum to achieve a maximum rate of dissolution. When more than 8% by weight of copper is initially added to the solution, the rate of dissolution is less than the maximum obtainable; and when less than about 8% is added, there is no worth while increase in the rate of dissolution.

As the dissolution of the copper proceeds, the temperature of the solution increases until it attains a maximum of about 70° to 80° C. When the amount of copper remaining undissolved has decreased substantially, then the rate at which heat is liberated by the dissolving reactions decreases to below the rate at which heat is dissipated from the solution and it begins to cool again. A thermocouple element 18 may be mounted in the dissolving tank 5 for the purpose of observing or recording the progressive changes that occur in the temperature of the solution, and the rise in the temperature of the solution and its subsequent gradual decline constitutes a useful indicator of the progress of the dissolution.

It is impossible to avoid having some of the particles of the cement copper attach themselves to the bubbles of froth which collect at the surface of the solution in the tank 5. Such copper is for all practical purposes removed from the oxidizing influence of the oxygen dissolved in the main body of the solution, and hence it does not dissolve to any significant extent. Accordingly, it is the best practice to adopt some means of breaking the froth at the surface of the liquid so that copper which is caught therein will drop down again into the body of the solution. Mechanical froth breakers (not shown) may be employed for this purpose, or the operator may keep the froth broken by paddles or other manually operated means.

When substantially all of the added copper has dissolved, the resulting acid solution of copper sulfate is withdrawn from the tank through a valved drain 19, and the tank is then refilled with fresh solution preparatory to dissolving a further batch of copper.

An embodiment of the new copper dissolving procedure in a process for the recovery of copper from a cupriferous ore by a leaching operation is illustrated diagrammatically in the flow sheet of Fig. 2. In this process the ore is delivered to a leaching operation wherein it is leached with a solution containing free sulfuric acid. The acid dissolves oxidized copper minerals to form a solution of cupric sulfate. The leach solution may also contain ferric sulfate, if such is desired for the purpose of dissolving copper sulfide minerals. The strong "off" solution withdrawn from the leaching operation, which has been enriched in copper in proportion to the amount dissolved from the ore and which has become correspondingly depleted in sulfuric acid and ferric sulfate (the latter having been reduced to ferrous sulfate), is delivered to an electrolytic operation. The solution there is electrolyzed, using insoluble anodes and copper cathodes, so that metallic copper is deposited from the solution on to the cathodes. Coincidentally, sulfuric acid is regenerated in the electrolyte and ferrous sulfate is reoxidized to ferric sulfate by reactions which occur at the anode. The electrolyzed solution is returned to the leaching operation, where it forms the acid leach solution used to dissolve copper from a further quantity of ore.

When substantially all of the copper has been dissolved from a leaching tank load of ore, the residue is washed to recover the copper in the leach solution still adhering to it. The copper-bearing wash waters removed from the ore at the conclusion of the washing operation are treated with scrap iron to precipitate metallic cement copper. Heretofore it has been customary to treat the cement copper thus produced at a copper smelter. In accordance with the invention, however, the cement copper is dissolved, utilizing the dissolving technique described above. The acid solution in which the copper is dissolved is most advantageously a portion of the electrolyzed solution withdrawn from the copper electrolysis operation. This solution contains free sulfuric acid, although for the purpose of obtaining rapid dissolution of the cement copper, considerable additional sulfuric acid ordinarily must be added to it to bring its acid concentration up to 150 grams per liter. Acid so added replaces make-up acid that would otherwise be added to the leach solution to replace normal operating losses. Ferric or ferrous sulfate present in the solution, and such impurities as it normally contains, do not impair its suitability for dissolving cement copper.

At the conclusion of the copper dissolving operation, the solution, now enriched in copper, is united with strong leach "off" solution that is ready to be electrolyzed, and the united solutions are thereafter subjected to electrolysis to recover the copper in the form of cathode metal.

Incorporation of the copper dissolving method of the invention in a copper recovery process of the character described is advantageous not only because it provides for ultimate recovery of the cement copper along with the other copper dissolved from the ore, but also because it is of material assistance in helping to minimize loss of ferric sulfate from the leach solution. This benefit results from the fact that the extent to which ferric sulfate is formed by oxidation of ferrous sulfate in the electrolytic operation depends on the amount of cathode copper coincidentally deposited (i. e. reduced). Dissolution of cement copper in accordance with the invention does not entail depleting the leach solution in ferric sulfate, but it makes extra copper available in the solution for deposition at the cathode during electrolysis, whereby some ferrous sulfate will concurrently be oxidized to the ferric form. Thus the amount of ferric sulfate formed in the electrolyzed solution from ferrous sulfate that is present therein is increased in proportion to the amount of copper that was dissolved in such solution, prior to electrolysis, in accordance with the invention.

It is thus apparent that the copper dissolving method of the invention, when embodied in a copper-recovery process of the character described, not only makes the over-all copper recovery operation more self-contained than has heretofore been the case, by providing for ultimate recovery of the cement copper in the cathode copper deposit, but at the same time substantially enhances the efficiency of the regeneration of ferric sulfate.

I claim:

1. In a process for the recovery of copper from a cupriferous ore, in which (a) the ore is leached with an acidic solution to obtain a strong copper-bearing leach solution, (b) the leached ore is washed with water to recover a dilute copper-bearing wash solution, (c) the strong leach solution is electrolyzed to recover metallic copper, and (d) the dilute wash solution is treated with metallic iron to produce metallic cement copper, the improvement which comprises forming a suspension of the cement copper in an acidic solution, agitating by mechanical means and aerating such solution in the presence of a frothing agent, dissolving substantially the entire amount of the cement copper in the acid solution, uniting the resulting solution of dissolved cement copper with the strong leach solution, and electrolyzing the united solutions.

2. In a process for the recovery of copper from a cupriferous ore, in which (a) the ore is leached with a sulfuric acid solution to obtain a strong copper-bearing leach solution depleted somewhat in acid, (b) the leached ore is washed with water to recover a dilute copper-bearing wash solution, (c) the strong leach solution is electrolyzed to produce metallic copper and to regenerate acid leach solution, and (d) the dilute wash solution is treated with metallic iron to precipitate metallic cement copper, the improvement which comprises forming a suspension of the cement copper in a portion of the regenerated acid solution from the electrolytic operation and agitating by mechanical means and aerating such portion of the solution, incorporating a frothing agent in said portion of regenerated solution while it is being agitated and aerated, dissolving substantially the entire amount of the cement copper in the acid solution, combining the resulting solution of dissolved cement copper with strong leach solution, and electrolyzing the combined solutions.

3. The method of dissolving finely divided metallic copper such as cement copper which comprises forming a suspension of said copper in an acid solution, agitating by mechanical means and aerating said solution, incorporating a frothing agent in said solution during the course of such agitation and aeration, and dissolving substantially the entire amount of cement copper added to the acid solution to form said suspension.

4. The method of dissolving finely divided metallic copper such as cement copper which comprises forming a suspension of said copper in an aqueous solution containing from 75 to 250 grams per liter of sulfuric acid, incorporating a frothing agent in said solution, agitating by mechanical means and aerating said solution in the presence of said frothing agent, and dissolving substantially the entire amount of cement copper added to the acid solution to form said suspension.

5. The method of dissolving finely divided metallic copper such as cement copper which comprises forming a suspension of said copper in an aqueous sulfuric acid solution, the amount of metallic copper employed in forming said suspension being about 8% by weight of the suspension, incorporating a frothing agent in said suspension, agitating by mechanical means and aerating said suspension in the presence of said frothing agent, and dissolving substantially the entire amount of cement copper added to the acid solution to form said suspension.

6. The method of dissolving finely divided metallic copper such as cement copper which comprises forming a suspension of said copper in an acid solution, agitating by mechanical means and aerating said solution, incorporating a frothing agent in said solution during the course of such agitation and aeration, whereby a froth containing particles of metallic copper collects at the surface of the solution, breaking said froth to cause the metallic particles carried thereby to drop into the main body of the agitated and aerated solution, and dissolving substantially the entire amount of cement copper added to the acid solution to form said suspension.

7. The method of dissolving finely divided metallic copper such as cement copper which comprises forming a suspension of said copper in an acid solution, agitating by mechanical means and aerating said solution, incorporating a frothing agent in said solution during the course of such agitation and aeration, portions of the total amount of frothing agent used being added to and incorporated in the solution at intervals throughout the duration of the agitation and aeration operation, and dissolving substantially the entire amount of cement copper added to the acid solution to form said suspension.

8. The method of dissolving finely divided metallic copper such as cement copper which comprises forming a suspension of such copper in an aqueous solution containing about 150 grams per liter of sulfuric acid, incorporating pine oil in said solution, agitating by mechanical means and aerating said solution in the presence of said pine oil, and dissolving substantially the entire amount of cement copper added to the aqueous solution to form said suspension.

(References on following page)

References Cited in the file of this patent

UNITED STATES PATENTS

| | | |
|---|---|---|
| 1,296,523 | Irving | Mar. 4, 1919 |
| 1,344,127 | Greenawalt | June 22, 1920 |
| 1,577,422 | Hybinette | Mar. 16, 1926 |
| 1,598,296 | MacKay | Aug. 31, 1926 |
| 1,802,919 | Kraut | Apr. 28, 1931 |
| 1,832,469 | Neill | Nov. 17, 1931 |
| 1,834,646 | Sandor | Dec. 1, 1931 |
| 1,927,376 | Schroder | Sept. 19, 1933 |
| 1,958,383 | Naucler et al. | May 8, 1934 |
| 1,992,208 | Harrison | Feb. 26, 1935 |
| 2,533,245 | Harike | Dec. 12, 1950 |

OTHER REFERENCES

Taggart Handbook of Mineral Dressing (1945), section 12, pages 33, 38, 39 and 44.